United States Patent
Hashimoto

(10) Patent No.: US 12,436,980 B2
(45) Date of Patent: Oct. 7, 2025

(54) METHOD, SERVER, INFORMATION PROCESSING APPARATUS, AND STORAGE MEDIUM FOR GENERATING QUERY CHARACTER STRING

(71) Applicant: CANON KABUSHIKI KAISHA, Tokyo (JP)

(72) Inventor: Tatsuya Hashimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/489,167

(22) Filed: Oct. 18, 2023

(65) Prior Publication Data

US 2024/0143637 A1    May 2, 2024

(30) Foreign Application Priority Data

Oct. 26, 2022   (JP) .................................. 2022-171482

(51) Int. Cl.
*G06F 16/334* (2025.01)
*G06F 16/338* (2019.01)

(52) U.S. Cl.
CPC .......... *G06F 16/334* (2019.01); *G06F 16/338* (2019.01)

(58) Field of Classification Search
CPC . G06F 16/9535; G06F 16/9538; G06F 16/334
See application file for complete search history.

(56) References Cited

U.S. PATENT DOCUMENTS

| | | | | |
|---|---|---|---|---|
| 10,521,854 | B1* | 12/2019 | Andrizzi | G06Q 30/0631 |
| 2006/0074884 | A1* | 4/2006 | Sawashima | G06F 16/951 |
| 2008/0208835 | A1* | 8/2008 | Sauls | G06F 16/957 |
| | | | | 707/999.005 |
| 2010/0318551 | A1* | 12/2010 | Lai | G06F 16/335 |
| | | | | 707/765 |
| 2011/0052074 | A1 | 3/2011 | Hayaishi | |
| 2014/0172821 | A1* | 6/2014 | Hu | G06F 16/9535 |
| | | | | 707/711 |
| 2016/0012135 | A1* | 1/2016 | Wang | G11C 5/06 |
| | | | | 707/731 |
| 2019/0163713 | A1* | 5/2019 | MacGillivray | G06F 16/9535 |
| 2021/0117478 | A1* | 4/2021 | Hopkins | G06F 16/3338 |

FOREIGN PATENT DOCUMENTS

JP    2011053781 A    3/2011

* cited by examiner

*Primary Examiner* — William P Bartlett
(74) *Attorney, Agent, or Firm* — ROSSI, KIMMS & McDOWELL LLP

(57) ABSTRACT

The information processing apparatus obtains a search result desired by a user by performing: receiving a first keyword selected by the user from among a plurality of keyword candidates and a second keyword input manually by the user; generating a query character string including a first synonym, which is generated by converting the first keyword, and the second keyword; and outputting the query character string for searching for contents.

19 Claims, 15 Drawing Sheets

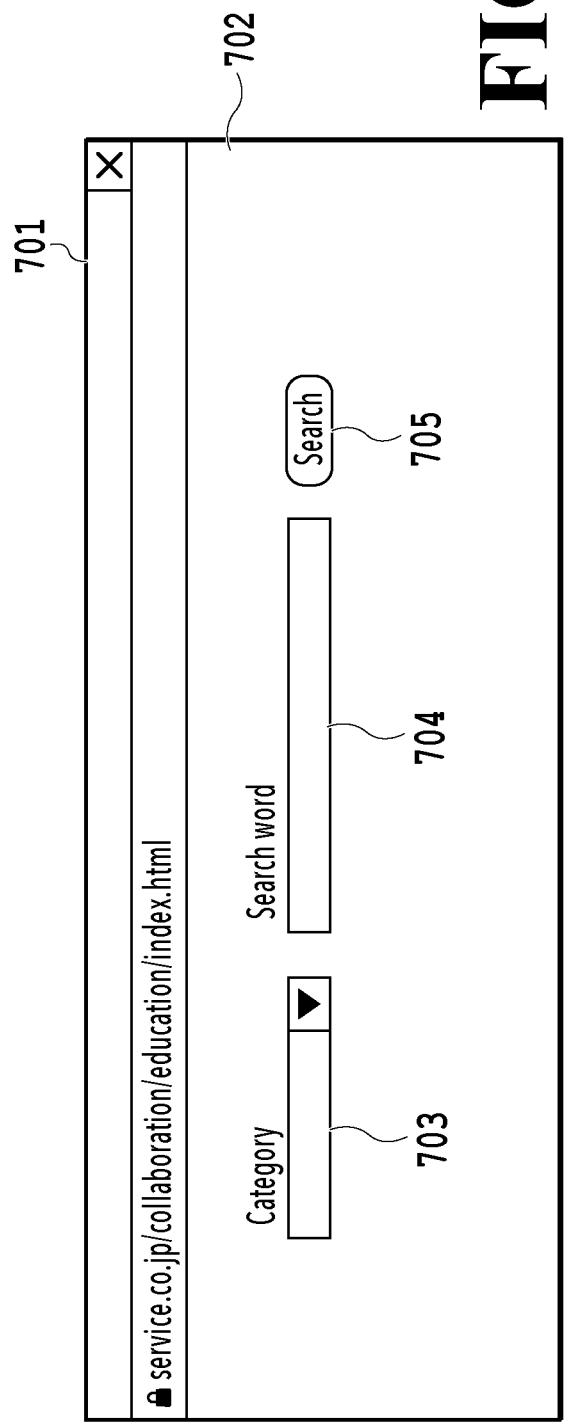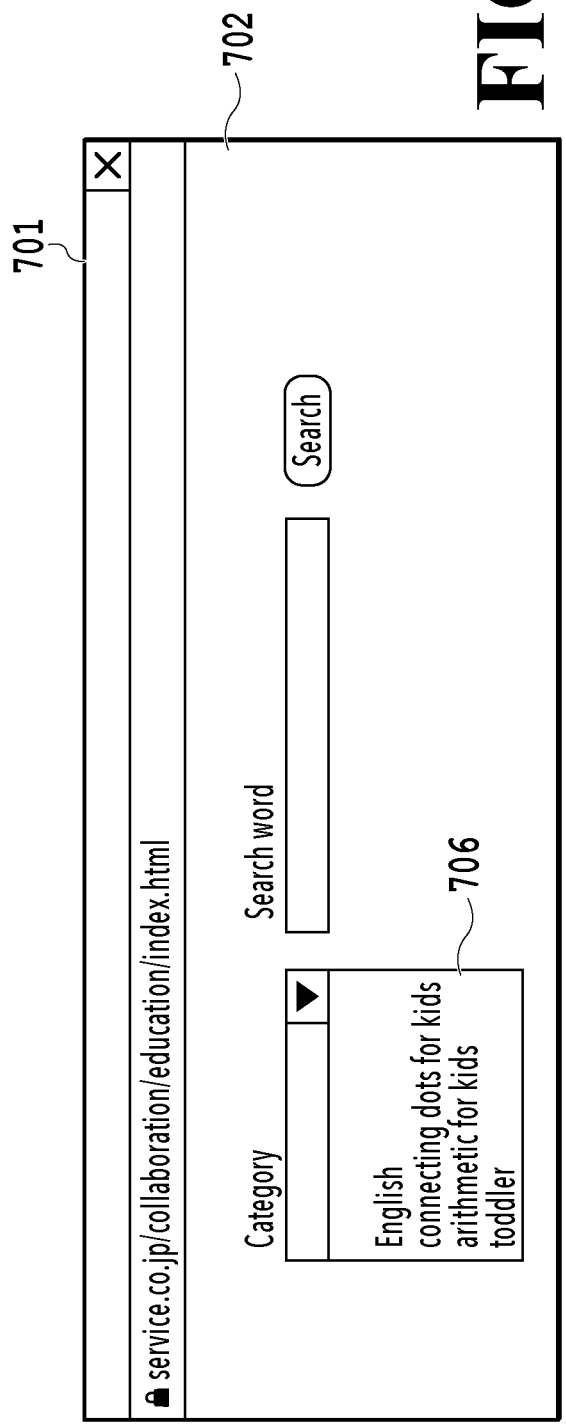

METHOD, SERVER, INFORMATION PROCESSING APPARATUS, AND STORAGE MEDIUM FOR GENERATING QUERY CHARACTER STRING

BACKGROUND OF THE DISCLOSURE

Field of the Disclosure

The present invention relates to a contents search technique.

Description of the Related Art

For example, as an educational material site, a search site is known, which displays search results of educational material contents by performing a search by inputting a keyword via a custom search API of a search engine registered in a site from which crawling originates. With respect to such a search site, there exists a technique to perform a search by converting a keyword preset in the custom search API of a search engine and a keyword freely described by a user into words with which the keywords are replaced in accordance with a dictionary preset in accordance with the educational material site. As one example of this technique, Japanese Patent Laid-Open No. 2011-053781 (hereinafter, referred to as Document 1) has disclosed a technique to convert a selected keyword selected by the user from among a plurality of candidates and a freely described keyword input manually by a user into synonyms, respectively, and search for contents close in nuance by using the two synonyms.

In the freely described keyword input manually by the user, the intention of the user is reflected strongly, and therefore, the technique of Document 1 described above has the following problem. That is, in a case where the freely described keyword is converted into a synonym, there is a possibility that the freely described keyword is converted into a word that is not intended by the user, and as a result of that, there are many hits of contents not intended by the user.

SUMMARY OF THE DISCLOSURE

The method according to the present invention is a method of causing an information processing apparatus to generate a query character string used for searching for contents, the method including: receiving a first keyword selected by a user from among a plurality of keyword candidates and a second keyword input manually by the user; generating the query character string including a first synonym, which is generated by converting the first keyword, and the second keyword; and outputting the query character string for searching for the contents.

Further features of the present disclosure will become apparent from the following description of exemplary embodiments with reference to the attached drawings.

BRIEF DESCRIPTION OF THE DRAWINGS

FIG. 7A is a schematic diagram of an initial display of a search screen and FIG. 7B is a schematic diagram showing a state where a pulldown list is displayed on the search screen;

FIG. 11 is a sequence chart showing one example in which the educational material contents are searched for;

DESCRIPTION OF THE EMBODIMENTS

Figure 1:
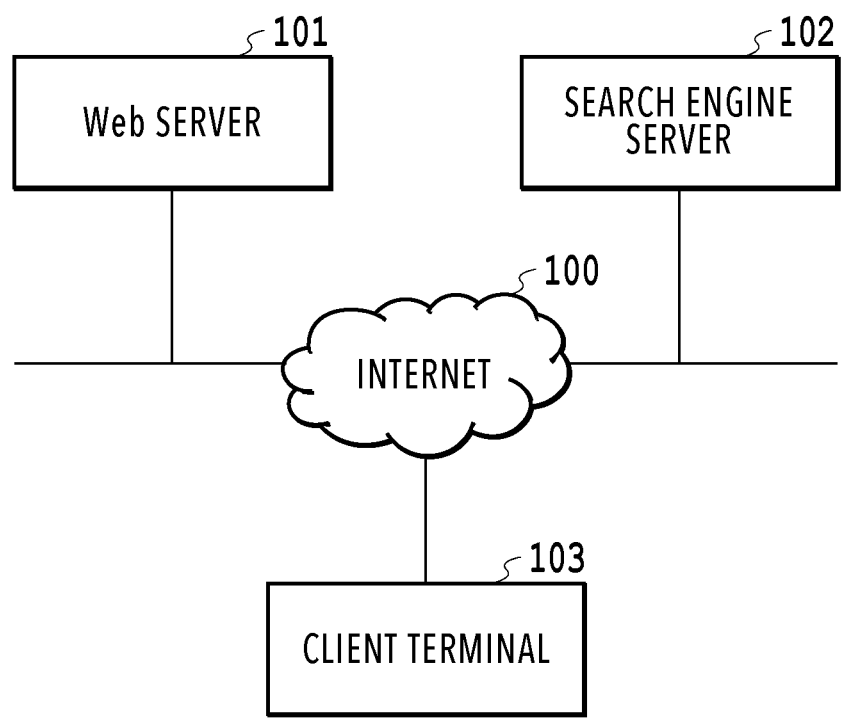
FIG. 1 is a block diagram showing a system configuration of an information processing system.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals. Further, each process (step) in the flowcharts is denoted by a reference numeral starting with S.

First Embodiment

The configuration of an information processing system in the present embodiment is explained by using FIG. 1.

FIG. 1 is a block diagram explaining the configuration of the information processing system including a computer of the present embodiment. As shown in FIG. 1, the information processing system in the present embodiment includes a Web server 101, a search engine server 102, and a client terminal 103. The Web server 101, the search engine server 102, and the client terminal 103 are connected to an internet 100 and capable of communication with one another. The information processing system may include another device, such as a router and a printer, and another network, such as a LAN. The Web server 101 and the search engine server 102 may be configured by one server device. Each of the Web server 101 and the search engine server 102 may be configured by a plurality of server devices. Even in a case where each of the Web server 101 and the search engine server 102 is configured by the plurality of server devices, in the present embodiment, the plurality of server devices is referred to as "server".

<Hardware Configuration of Server>

Figure 2:
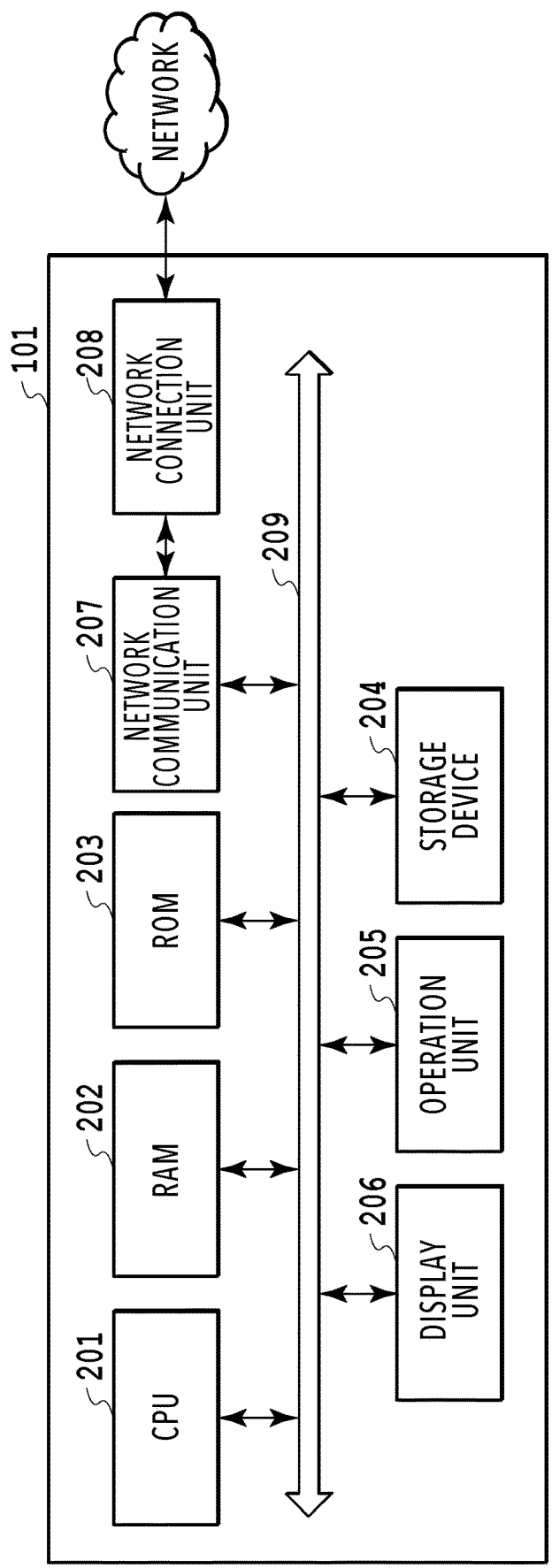
FIG. 2 is a block diagram showing a hardware configuration of a Web server and a search engine server.

The hardware configuration of the Web server 101 in the present embodiment is explained by using FIG. 2.

FIG. 2 is a block diagram showing one example of the hardware configuration of the Web server 101. The Web server 101 is an information processing apparatus including a CPU 201, a RAM 202, a ROM 203, a storage device 204, an operation unit 205, a display unit 206, a network communication unit 207, and a network connection unit 208.

The CPU 201 is a central processing unit configured to comprehensively control each unit of the Web server 101.

The RAM 202 plays a role of a work memory that is necessary at the time of the CPU 201 executing programs.

The ROM 203 is a read only memory for storing boot programs necessary to activate the system. Further, the ROM 203 stores control programs that are executed by the CPU 201 and data tables, and fixed data such as an incorporated operating system (hereinafter, referred to as "OS") program. Each control program stored in the ROM 203 performs software execution control such as scheduling, task switch, and interrupt processing, under the management of the incorporated OS stored in the ROM 203.

The storage device 204 is a device storing programs that are executed by the CPU 201 and various types of information, and is a nonvolatile storage device, for example, such as a magnetic disk or a flash memory.

The operation unit 205 is a keyboard, a mouse and the like for receiving various input operations by a user.

The display unit 206 displays various types of information on the user interface screen or the like and includes, for example, an LCD.

The network communication unit 207 is connected to a network such as the internet 100 via the network connection unit 208 and performs various types of communication.

The network connection unit 208 has a configuration corresponding to, for example, a wireless LAN, an Ethernet terminal (registered trademark) or the like.

Each of the above-described units is connected to one another via a bus 209 and is capable of performing transmission and reception of data with one another.

In the present embodiment, it is assumed that the search engine server 102 is an information processing apparatus including the same hardware configuration as that of the Web server 101. The search engine server 102 may have a hardware configuration different from that of the Web server 101.

<Hardware Configuration of Client Terminal>

Figure 3:
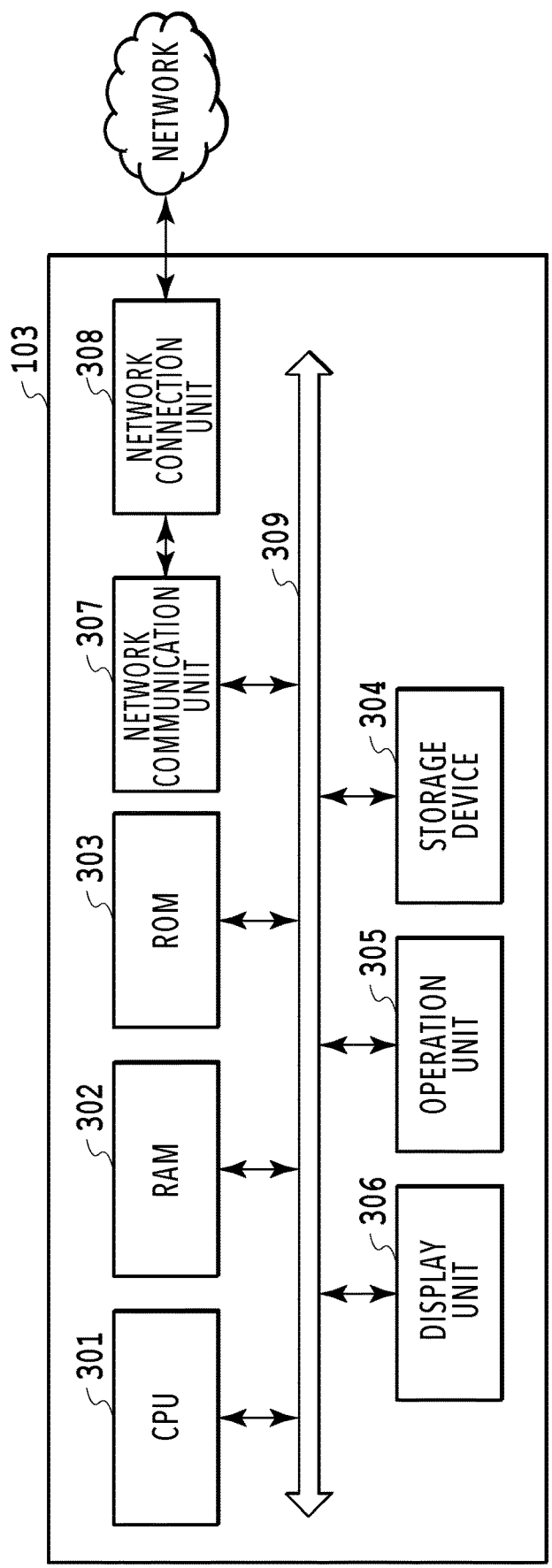
FIG. 3 is a block diagram showing a hardware configuration of a client terminal.

The hardware configuration of the client terminal 103 in the present embodiment is explained by using FIG. 3.

FIG. 3 is a block diagram showing one example of the hardware configuration of the client terminal 103. The client terminal 103 is an information processing apparatus comprising a CPU 301, a RAM 302, a ROM 303, a storage device 304, an operation unit 305, a display unit 306, a network communication unit 307, and a network connection unit 308.

The CPU 301 is a central processing unit configured to comprehensively control each unit of the client terminal 103.

The RAM 302 is a work memory that is necessary at the time of the CPU 301 executing programs.

The ROM 303 stores control programs that are executed by the CPU 301 and data tables, and fixed data, such as an incorporated OS program. Each control program stored in the ROM 303 performs software execution control such as scheduling, task switch, and interrupt processing, under the management of the incorporated OS stored in the ROM 303.

The storage device 304 is a nonvolatile storage device and stores various operation mode settings, operation logs and the like, which need to be stored after the reboot of the client terminal 103.

The operation unit 305 is a keyboard, a mouse and the like for receiving various input operations by the user.

The display unit 306 is configured by including, for example, a monitor connection terminal, and in a case where a liquid crystal monitor is connected, the display unit 306 displays various types of information on a user interface screen.

In the present embodiment, the operation unit 305 and the display unit 306 may be integrated as an operation display unit. As one example of the operation display unit, there is an operation panel or the like.

The network communication unit 307 is connected to a network such as the internet 100 via the network connection unit 308 and performs various types of communication.

The network connection unit 308 has a configuration corresponding to, for example, a wireless LAN, an Ethernet terminal or the like.

Each of the above-described units is connected to one another via a bus 309 and is capable of performing transmission and reception of data with one another. As the client terminal 103, for example, a PC, a smartphone, or a tablet terminal may be used.

<Software Configuration of Web Server>

Figure 4:
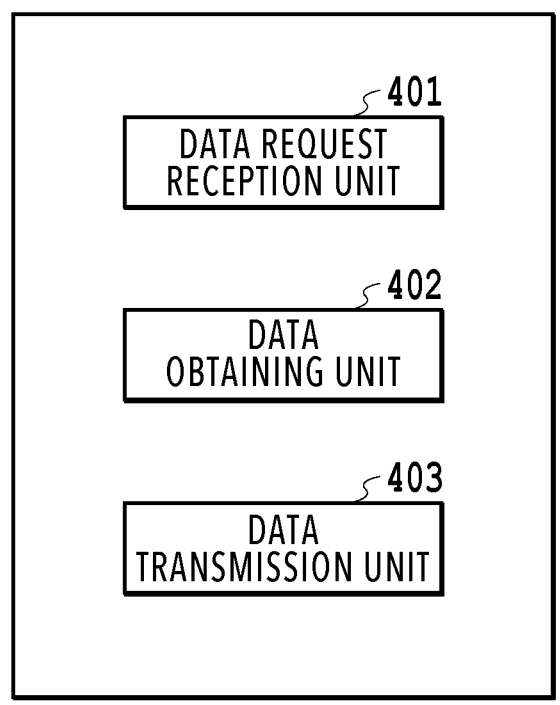
FIG. 4 is a function block diagram of software of the Web server.

The software configuration of the Web server 101 in the present embodiment is explained by using FIG. 4.

FIG. 4 shows a function block diagram of software that is provided to the Web server 101. The software of the Web server 101 includes a data request reception unit 401, a data obtaining unit 402, and a data transmission unit 403.

The data request reception unit 401 receives a request to access data from the client terminal 103 via the network communication unit 207.

The data obtaining unit 402 accesses the storage device 204 and obtains data in response to the request received by the data request reception unit 401.

The data transmission unit 403 transmits the following files to the client terminal 103 via the network communication unit 207. The transmitted files are the HTML file of the search screen obtained via the data obtaining unit 402, the Javascript program of search processing, the list file in which domain names of search-target sites are stored, and the keyword wording conversion list file. Here, HTML is an abbreviation of Hyper Text Markup Language.

<Software Configuration of Client Terminal>

Figure 5:
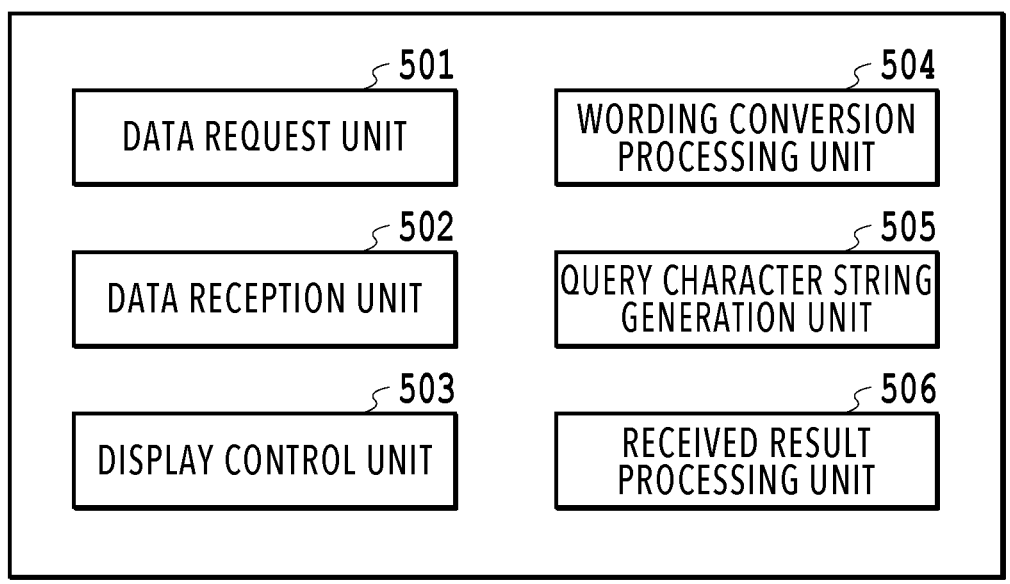
FIG. 5 is a function block diagram of software of the client terminal.

The software configuration of the client terminal 103 in the present embodiment is explained by using FIG. 5.

FIG. 5 shows a function block diagram of software that is provided to the client terminal 103. The software of the client terminal 103 includes a data request unit 501, a data reception unit 502, a display control unit 503, a wording conversion unit 504, a query character string generation unit 505, and a result processing unit 506.

The data request unit 501 performs a request to access data to an external server such as the Web server 101 or the search engine server 102 via the network communication unit 307. The data request unit 501 performs a request to access the search screen to the Web server 101. The data request unit 501 requests a search result(s) by transmitting a query character string that is generated by the query character string generation unit 505 to the search engine server 102.

The data reception unit 502 receives data from the external server via the network communication unit 307. The data reception unit 502 receives the HTML file of the search screen that is displayed in the Web browser, the Javascript program of search processing, the list file in which the domain names of the search-target sites are stored, and the keyword wording conversion list file from the Web server 101. The data reception unit 502 receives the total number of searches and the search result(s) including the thumbnail image URL, the title, and the link destination URL of the contents of each of the search result(s) from the search engine server 102.

The display control unit 503 displays the results of the OS, the Web browser, and an application on the display unit 306.

The wording conversion unit 504 converts the selected value of the pulldown list of the search screen of the Web browser into wording in accordance with the search-target site.

The query character string generation unit 505 configures the query character string, which is transmitted to the search engine, from the wording in accordance with the search-target site, which is converted by the wording conversion unit 504, and the input value of the Search word input field.

The result processing unit 506 performs processing to rearrange the search result(s) for each site, which is obtained via the data reception unit 502, and add up the search results for each site.

<About Search Engine Server>

The search engine server 102 includes a custom search API with which it is possible for the user to customize the site from which crawling originates.

The search engine server 102 crawls each Web site in accordance with the URL of the Web site registered to the custom search API.

Then, the search engine server 102 stores data including the URL of the thumbnail image of the contents, the title of the contents, and the URL of the contents page about the crawled Web site in the storage device 204.

Upon receipt of the search word via the custom search API, the search engine server 102 performs search processing and returns the search result(s) to the source of the search. The source of the search may be the Web server 101 or the client terminal 103.

<Search Processing>

In the following, processing to search for contents of an educational material site in the present embodiment is explained by using FIG. 6 to FIG. 9.

Figure 6:
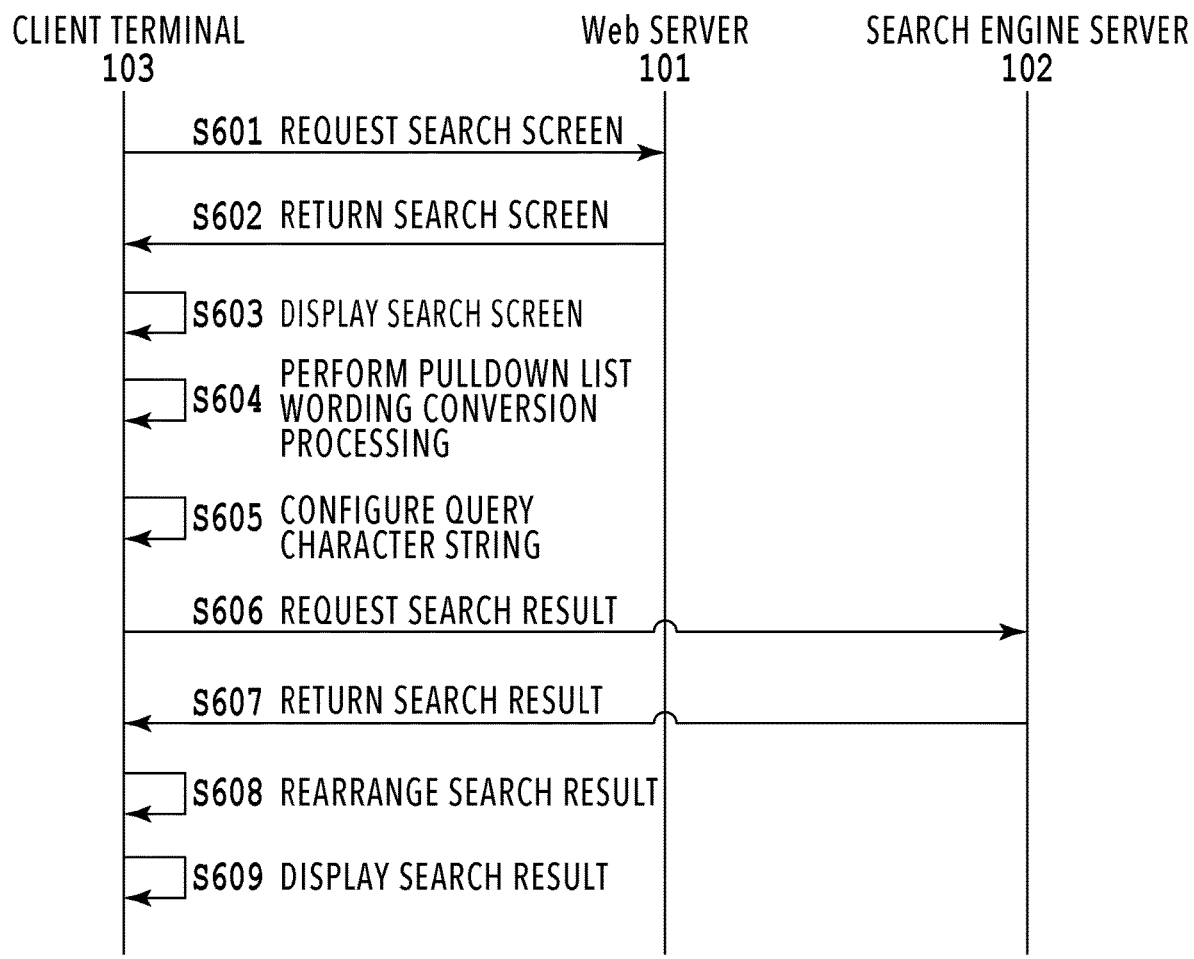
FIG. 6 is a sequence chart showing one example in which educational material contents are searched.

FIG. 6 is a sequence chart showing one example of processing to access to the search engine server 102 by the Web browser of the client terminal 103 and display the search result(s).

The processing of the client terminal 103 in FIG. 6 is implemented as follows. For example, the CPU 301 reads programs stored in the ROM 303 onto the RAM 302 and executes the programs.

The processing of the Web server 101 in FIG. 6 is implemented as follows. For example, the CPU 201 reads programs stored in the ROM 203 onto the RAM202 and executes the programs.

The processing of the search engine server 102 in FIG. 6 is implemented as follows. For example, the CPU 201 reads programs stored in the ROM 203 onto the RAM 202 and executes the programs.

It may also be possible to implement part of or all of the processing in FIG. 6 by hardware such as an ASIC (Application Specific Integrated Circuit) or an electronic circuit.

The main unit in each piece of the following processing is the CPUs included in the client terminal 103, the Web server 101, and the search engine server 102.

FIG. 7A is a diagram showing the initial display state of a search screen 702 displayed within a screen 701 by the Web browser of the client terminal 103.

FIG. 7A shows the initial state of the search screen 702. The search screen 702 includes a pulldown list (selection area) 703, a Search word input field (input area) 704, and a Search button 705.

FIG. 7B is a diagram showing the state where the pulldown list 703 is displayed on the search screen 702. The pulldown list 703 includes keyword candidates 706. In a case where one of the rows of the keyword candidates 706 is selected by the user, the candidate of the selected row is displayed and is set as the selected value in the pulldown list 703. In a case where a blank row (white space) is selected in the keyword candidates 706, the state of the pulldown list is set as the non-selected state.

Each of the keyword candidates 706 except for the blank rows is associated with the educational material site.

Figure 8:
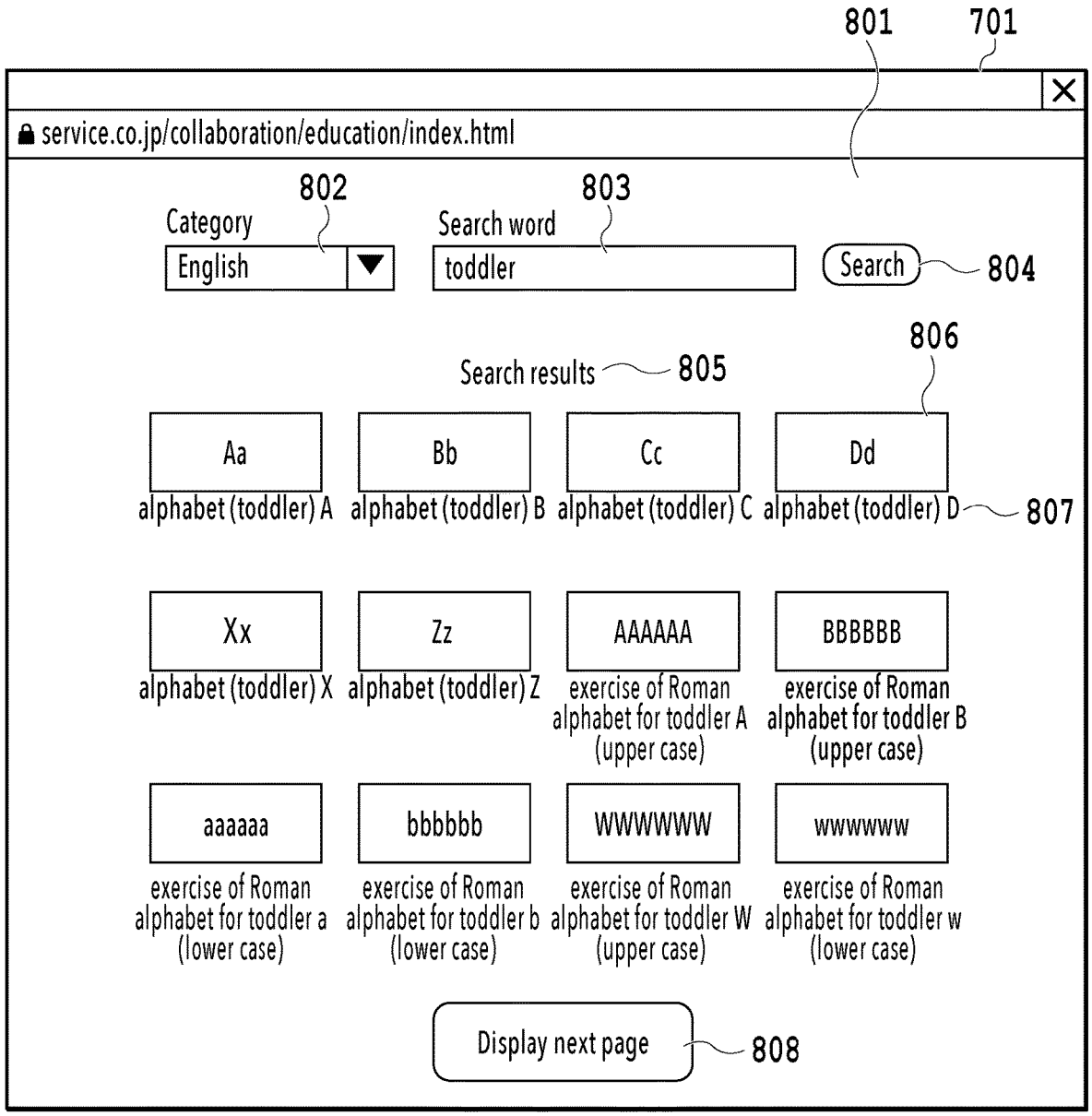
FIG. 8 is a schematic diagram of a search result screen.

FIG. 8 is a diagram showing the state after the search result(s) is displayed on the search screen 702 displayed within the screen 701 by the Web browser of the client terminal 103. The screen in FIG. 8 may be displayed by the transition of the screen from the search screen 702.

In the search result screen 801 in FIG. 8, the following data is displayed. The data includes a pulldown list 802 including a selected value, a Search word input field 803, a Search button 804, a title 805 of a search list, a thumbnail image 806 of the search result(s), a contents title 807 of the search result(s), and a Display next page button 808. Here, the Display next button 808 is displayed in a case where the total number of searches in which the client terminal 103 receives from the search engine server 102 exceeds the number of displays per page.

In the present embodiment, it is assumed that the number of displays per page is twelve. In a case where the Search button 804 is pressed down in the state where the search result(s) of the total number of searches is displayed, the search processing is performed again at the starting position after the total number of searches.

In the title 805 of the search list, the total number of searches received from the search engine server 102 may also be displayed together.

In the contents title 807 of the search result(s), the domain name of the link destination site may be displayed in the changed new line.

On the Display next page button 808, a pagination may be displayed in accordance with the total number of searches displaying the search result(s) after the number of displays per page and the number of displays per page.

The entirety of the single contents of the thumbnail image 806 and the contents title 807 may be drawn by the background color, the background image, the outer frame line and the like for each educational material site from which the search result(s) originates.

Figure 9:
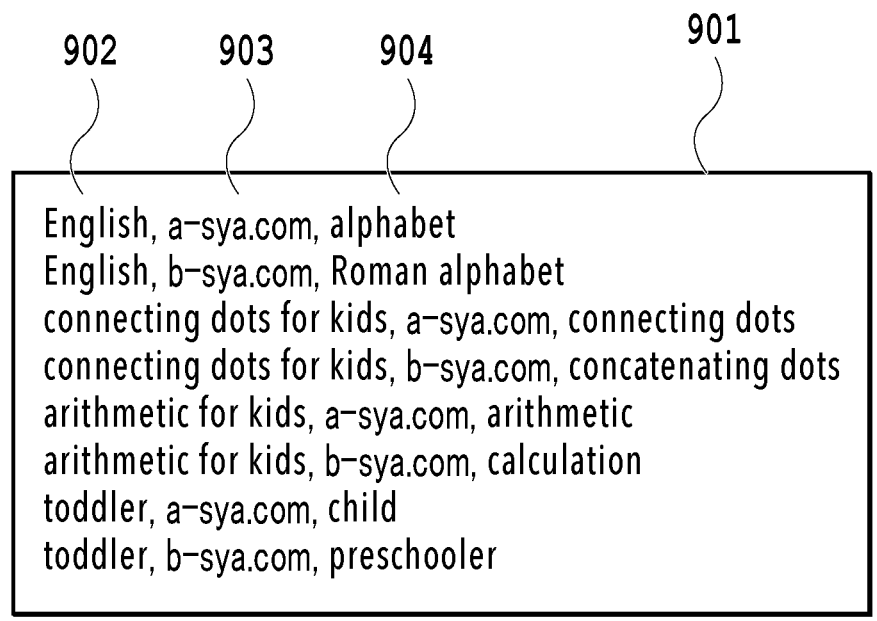
FIG. 9 is a schematic diagram of a keyword wording conversion list.

FIG. 9 is a diagram showing a keyword wording conversion list file 901 that is stored in the Web server 101.

The keyword wording conversion list file 901 includes a selected value keyword 902, a domain name 903, and converted keyword wording 904. In the keyword wording conversion list file 901, wording whose relevancy to the selected value keyword 902 is great is set by a search site operator for each educational material site and the keyword wording conversion list file 901 is stored in the Web server 101.

The wording being output by inferring the wording in accordance with the educational material site using a machine learning system, not shown schematically, may be included in the keyword wording conversion list file 901.

Further, the keyword wording conversion list file 901 may be configured in the XML format or may be configured in the JSON format.

In a case where a user operation is received on the screen 701 displayed by the Web browser of the client terminal 103 activated by the user, the processing in FIG. 6 is started. The processing in FIG. 6 is implemented by, for example, the CPU 301 of the client terminal 103 reading programs stored in the ROM 303 onto the RAM 302 and executing the programs.

At S601, the client terminal 103 detects an access operation to the search screen 702, such as the reception of the input of the URL of the search screen 702 in the address input field on the screen 701 or the pressing down of a hyper link to the search screen 702. In a case where the client terminal 103 detects the access operation to the search screen 702, the data request unit 501 of the client terminal 103 requests the search screen 702 against the Web server 101.

At S602, the data transmission unit 403 of the Web server 101 returns the following files to the Web browser of the client terminal 103. The HTML file of the search screen 702 requested by the client terminal 103, the Javascript program of search processing, the list file in which the domain names of the search-target sites are stored, and the keyword wording conversion list file are included in the files.

The HTML file and the Javascript program are stored in advance in the Web server 101. The information on the search-target site may be written to the Javascript program or may be included from the Javascript program.

At S603, the data reception unit 502 of the client terminal 103 receives the HTML file and the Javascript program transmitted from thee Web server 101 at S602 by the Web browser. The display control unit 503 of the client terminal 103 displays the search screen 702 on the display unit 306 based on the HTML file and the Javascript program.

At S604, in a case where the CPU 301 detects the pressing down of the Search button 705 by a user, the wording conversion unit 504 of the client terminal 103 performs the following processing. The wording conversion unit 504 of the client terminal 103 converts the selected value of the pulldown list into wording suitable to the search-target site in accordance with the Javascript program received at S602 and stores the wording.

The detailed flow of the pulldown list wording conversion processing at S604, which is performed by the client terminal 103, will be described later by using the flowchart in FIG. 9.

At S605, the query character string generation unit 505 of the client terminal 103 configures the following query character string in accordance with the notation determined in the search engine server 102. The query character string is configured so that the search is performed all at once for all the search-target sites by using the wording of each search-target site, which is converted at S604, the search keyword by the input value of the Search word input field 704, and the set of the domain names of the search-target sites. By using the query character string, the result(s) in which the search result(s) for each search-target site is added up is obtained. Here, the search keyword by the input value of the Search word input field 704 is set to the search keyword without being converted.

At S606, the data request unit 501 of the client terminal 103 transmits the query character string configured at S605 to the search engine server 102 by the Web browser. At S606, in a case where a plurality of the search-target sites is registered in the search engine server 102, the search result (s) of all the search-target sites is requested.

At S607, the data reception unit 502 of the client terminal 103 receives the total number of searches and the data including the thumbnail image URL, the title, and the link destination URL of the contents for each of the search result(s) from the search engine server 102.

At S608, the result processing unit 506 of the client terminal 103 performs the rearrangement of the search result(s) for each domain name of the educational material site and stores the rearranged search result(s).

At S609, the result processing unit 506 of the client terminal 103 generates HTML data from the search result(s). The display control unit 503 of the client terminal 103 displays the screen 701 on the display unit 306 based on the generated HTML data. The display order for each of the search result(s) may be in accordance with each domain name of the educational material site, or may be the order as it is received from the search engine server 102.

<Wording Conversion Processing>

Figure 10:
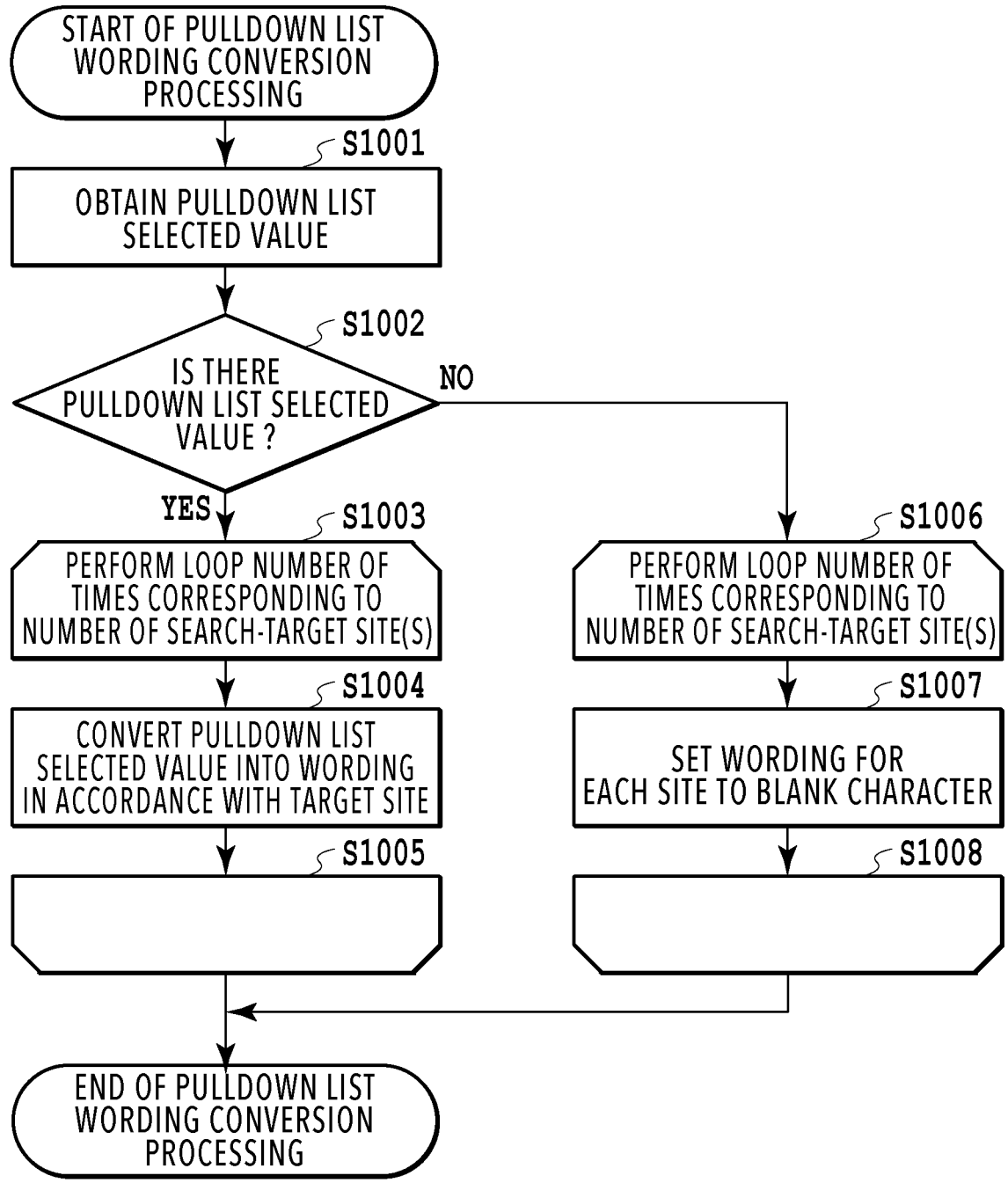
FIG. 10 is a flowchart showing one example in which wording conversion processing of a selected value of a pulldown list is performed.

Next, by using the flowchart in FIG. 10, the detailed flow of the pulldown list wording conversion processing at S604 is explained, which is performed by the client terminal 103 in FIG. 6. In a case where the CPU 301 of the client terminal 103 detects the pressing down of the Search button 705 by the user, the processing of the flowchart in FIG. 10 is performed in the wording conversion unit 504 of the client terminal 103.

At S1001, the wording conversion unit 504 of the client terminal 103 obtains the selected value of the pulldown list 703 and the processing advances to S1002.

At S1002, the wording conversion unit 504 of the client terminal 103 determines the presence/absence of the selected value of the pulldown list 703. In a case where the wording conversion unit 504 of the client terminal 103 determines that the selected value of the pulldown list 703 exists, the processing advances to S1003. In a case where the wording conversion unit 504 of the client terminal 103 determines that the selected value of the pulldown list 703 does not exist, the processing advances to S1006.

S1003 represents the start symbol of the loop end and the wording conversion unit 504 of the client terminal 103 repeatedly performs the processing at S1004 by taking the list of the domain names of the search-target sites received at S602 as the processing target.

At S1004, the wording conversion unit 504 of the client terminal 103 collates the selected value keyword 902 of the keyword wording conversion list file 901 with the domain name 903 by using the selected value of the pulldown list 703 and the domain name of the search-target site to be processed. Then, the wording conversion unit 504 of the client terminal 103 stores the combination of the domain name 903 in the row that matches with the keyword wording conversion list file 901 and the converted keyword wording 904. However, the search keyword by the input value of the Search word input field 704 is not converted.

S1005 represents the end symbol of the loop end and in a case where the wording conversion unit 504 of the client terminal 103 performs the processing at S1004 for all the search-target sites, the loop is exited and the processing of the flowchart shown in FIG. 10 is finished.

S1006 represents the start symbol of the loop end and the wording conversion unit 504 of the client terminal 103 repeatedly performs the processing at S1007 by taking the list of the domain names of the search-target sites received at S602 as the processing target.

At S1007, the wording conversion unit 504 of the client terminal 103 stores the combination of the domain name of the search-target site to be processed and a blank character.

S1008 represents the end symbol of the loop end and in a case where the wording conversion unit 504 of the client terminal 103 performs the processing at S1007 for all the search-target sites, the loop is exited and the processing of the flowchart shown in FIG. 10 is finished.

In the present embodiment, an example of the search keyword in a case where "English" is input to the pulldown-list 703 and "toddler" is input to the Search word input field 704 is shown in the following.

In a case where the wording conversion processing has also been performed for the input value of the Search word input field at S604, the following query character string is configured. The query character string with which a search is performed with a search keyword of "alphabet child" for a domain name a-sya.com and with a search keyword of "Roman alphabet preschooler" for a domain name b-sya-.co.jp is configured.

In this case, in "Roman alphabet preschooler" for b-sya-.co.jp, there is a hit with "preschooler" but there is no hit with "Roman alphabet" and there is a possibility that a page of character exercises of hiragana or katakana including "character" estimated from "Roman alphabet" or the like is hit. Consequently, there is a case where a page not intended by the user is hit.

As in the present embodiment, in a case where the wording conversion processing is not performed for the Search word input field at S604, the following query character string is configured. The query character string with which a search is performed with a search keyword of "alphabet toddler" for the domain name a-sya.com and with a search keyword of "Roman alphabet toddler" for the domain name b-sya.co.jp is configured.

In this case, for a page including the above-described "preschooler" and "character", since the estimation from "toddler" and the estimation from "Roman alphabet" are needed, the possibility that a page of character exercises of hiragana or katakana is hit is reduced. Consequently, the possibility that a page not intended by the user is hit is reduced.

As explained above, according to the present embodiment, in the search for the plurality of the sites, it is possible to obtain the search result(s) desired by the user by the search with a keyword preset in accordance with the plurality of the sites and the search with the freely described keyword.

Further, in the present embodiment, the explanation is given by using the case where the Web server 101, the search engine server 102, and the client terminal 103 are connected via the internet, but the connection aspect is not limited to this. For example, the Web server 101, the search engine server 102, and the client terminal 103 may be connected locally to one another.

Second Embodiment

In the first embodiment, the example is explained in which the summed query character string is configured by summing up the query character string, which is generated from the search keyword including the character string obtained by converting the selected value of the pulldown list 703 for each search-target site at S605, in all the sites.

However, there is an upper limit to the length of URL including the query character string which the search engine server 102 can receive. In a case where the number of search-target sites is large, there is such a problem that the query character string becomes long and it is not possible for the client terminal 103 to transmit the query character string to the search engine server 102.

Further, at S607, in the search result(s) for the query character string by the search engine server 102, the order of the search result(s) for each search-target site is changed to the order of the score evaluated inside the search engine server 102.

In a case where the upper limit to the number of the search result(s) to be returned at a time from the search engine server 102 is set, the following problem also occurs. That is, such a problem occurs that it is not possible for the client terminal 103 to determine whether or not the number of the search result(s) for each search-target site has reached the upper limit at the time of the rearrangement processing at S608 only by using the search result(s) returned from the search engine server 102.

In the present embodiment, an aspect is explained in which it is possible to suppress the query character string from becoming long and determine whether or not the number of the search result(s) has reached the upper limit for each search-target site by performing the search with the query character string for each search-target site.

In the present embodiment, points different from those of the first embodiment are mainly explained.

Figure 11:
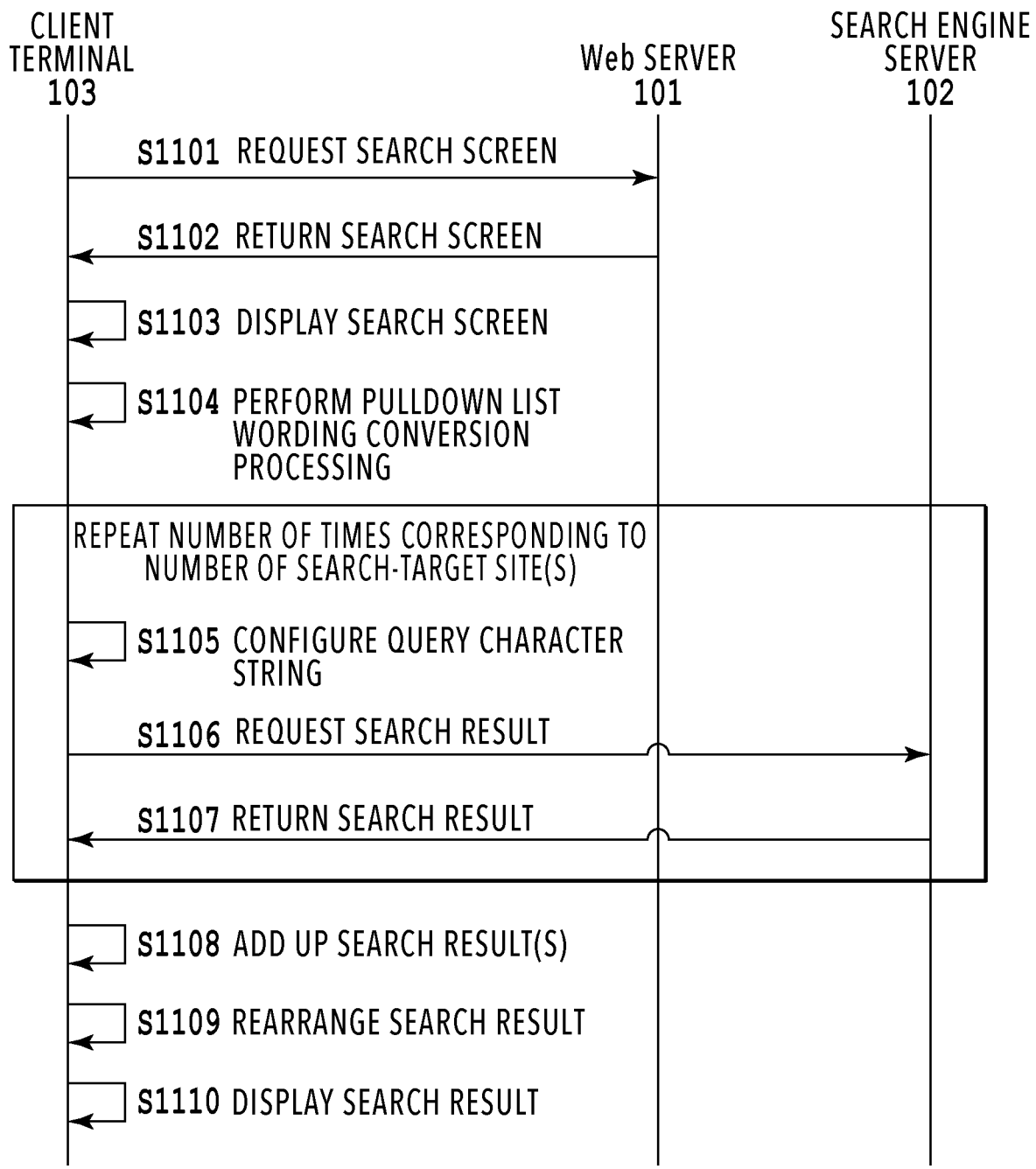

FIG. 11 is a sequence chart showing one example of the processing in which the client terminal 103 displays the search result(s) by accessing the search engine server 102 by using the Web browser and obtaining the search result(s).

The processing of the client terminal 103 in FIG. 11 is implemented by, for example, the CPU 301 reading programs stored in the ROM 303 onto the RAM 302 and executing the programs.

The processing of the Web server 101 in FIG. 11 is implemented by, for example, the CPU 201 reading programs stored in the ROM 203 onto the RAM202 and executing the programs.

The processing of the search engine server 102 in FIG. 11 is implemented by, for example, the CPU 201 reading programs stored in the ROM 203 onto the RAM 202 and executing the programs.

It may also be possible to implement part of or all of the processing in FIG. 11 by hardware, such as an ASIC or an electronic circuit.

In the following, the main unit in each piece of the processing is the CPUs which are included in the client terminal 103, the Web server 101, and the search engine server 102.

The processing of S1101 to S1104 is the same as the processing of S601 to S604 in FIG. 6, and therefore, the explanation of the processing is omitted.

In the processing of S1105 to S1107, the list of the domain names of the search-target sites received at S1102 is repeatedly used as the processing target.

At S1105, the query character string generation unit 505 of the client terminal 103 configures the following query character string in accordance with the notation determined in the search engine server 102. The query character string includes the wording of each search-target site, which is converted at S1104, the search keyword by the input value of the Search word input field 704, and the domain name of the search-target site. The query character string is generated for each search-target site. Here, the search keyword by the input value of the Search word input field 704 is set to the search keyword without being converted.

At S1106, the data request unit 501 of the client terminal 103 transmits the query character string of each search-target site, which is configured at S1105, to the search engine server 102 by the Web browser.

At S1107, the data reception unit 502 of the client terminal 103 receives the total number of the searches and the data including the thumbnail image URL, the title, and the link destination URL of the contents of each of the search result(s) for each search-target site from the search engine server 102. Then, the result processing unit 506 of the client terminal 103 stores the received data as the search result(s) of the search-target site being processed.

At S1108, the result processing unit 506 of the client terminal 103 stores the search result(s) received at S1107 of each search-target site all at once.

The processing of S1109 to S1110 is the same as the processing of S608 to S609 in FIG. 6, and therefore, the explanation of the processing is omitted.

In the present embodiment, an example of a case where "English" is input to the pulldown list 703 and "toddler" is input to the Search word input field is shown in the following.

In the first embodiment, in the processing at S605, the query character string, which is configured by the search keyword of "alphabet toddler" for the domain name a-sya-.com and the search keyword of "Roman alphabet toddler" for the domain name b-sya.co.jp, is used in the search. That is, in the query character string, "alphabet toddler" and "a-sya.com", and "Roman alphabet toddler" and "b-sya-.co.jp" are included. In a case where a search-target site is added, the search keyword and the domain name in accordance with the added search-target site are included in the query character string, and therefore, the query character string becomes further longer. In a case where the query character string whose length exceeds the length of the query character string that the search engine server 102 can receive is transmitted to the search engine server 102, an error is returned to the client terminal 103.

In the present embodiment, at S1105, the query character string generation unit 505 of the client terminal 103 configures the query character string so that the search is performed by using the search keyword of "alphabet toddler" for the domain name a-sya.com. At S1106, the data request unit 501 of the client terminal 103 requests the search result(s) for the query character string to the search engine server 102. At S1107, the data reception unit 502 of the client terminal 103 receives the search results for a-sya.com from the search engine server 102.

Then, the processing returns to S1105 and the query character string generation unit 505 of the client terminal 103 configures the query character string so that which the search is performed by using the search keyword of "Roman alphabet toddler" for the domain name b-sya.co.jp. At S1106, the data request unit 501 of the client terminal 103 requests the search result(s) for the query character string to the search engine server 102. At S1107, the data reception unit 502 of the client terminal 103 receives the search result(s) for b-sya.co.jp.

As described above, the query character string that is configured at S1105 includes the search keyword and the domain name corresponding to one search-target site, and therefore, the query character string does not become too long. Consequently, it is possible for the client terminal 103 to securely transmit the query character string to the search engine server 102.

Further, the search result(s) obtained at S607 of the first embodiment is a mixture of the result(s) for each search-target site. In a case where there is an upper limit to the number of the search result(s), it is not possible for the client terminal 103 to determine whether or not the number of the search result(s) of each search-target site has reached the upper limit by using only the returned search result(s) obtained by counting the search result(s) for each search-target site.

In a case where the search is performed again by the Display next page button 808 being pressed down after the rearrangement processing is performed at S608, there is a possibility that there is no longer consistency between the search result(s) of the rearrangement processing at the time of the first search and the search result(s) of the rearrangement processing in the second time search.

In the present embodiment, the search result(s) is obtained for each search-target site in the processing of S1105 to S1107, and therefore, it is possible to grasp the number of the search result(s) for each search-target site by counting the search result(s) for each search-target site. In a case where a search is performed again by the Display next page 808 being pressed down after the rearrangement processing at S1109 is performed, it is possible to display the results which are consistent between the search result(s) of the rearrangement processing at the time of the first search and the search result(s) of the rearrangement processing in the second time search.

As explained above, according to the present embodiment, by performing the search for each search-target site, the query character string is the character string corresponding to one search-target site, and therefore, the query character string does not become too long. Further, the search-target site is searched individually, and therefore, it also becomes possible to perform the rearrangement processing by determining whether or not the number of the search result(s) for each search-target site has reached the upper limit.

Further, in the present embodiment, the explanation is given by using the case where the Web server 101, the search engine server 102, and the client terminal 103 are connected via the internet, but the connection aspect is not limited to this. For example, the Web server 101, the search engine server 102, and the client terminal 103 may be connected locally to one another.

Third Embodiment

In the first embodiment, the example is explained in which the client terminal 103 performs the pulldown list wording conversion processing, configures the query character string, obtains the search result(s) by communicating with the search engine server 102, and performs the rearrangement of the search result(s).

However, depending on the number of the search result(s), there is a case where the load of the rearrangement processing of the search result(s) at S608 and the processing to convert the search result(s) into the HTML data for display at S609 becomes heavy. Thereby, there is a possibility that the display processing at S609 is delayed in the client terminal 103.

In the present embodiment, the Web server 101 performs the pulldown list wording conversion processing, configures the query character string, obtains the search result(s) by communicating with search engine server 102, and performs the rearrangement of the search result(s).

Then, the Web server 101 transmits the rearranged search result(s) to the client terminal 103. The client terminal 103 receives the rearranged search result(s) from the Web server 101 and displays the received search result(s). Thereby, it is possible to reduce the processing load of the client terminal 103. In the following, a specific example of the present embodiment is explained.

In the present embodiment, points different from those of the first embodiment are mainly explained.

<Software Configuration of Web Server>

Figure 12:
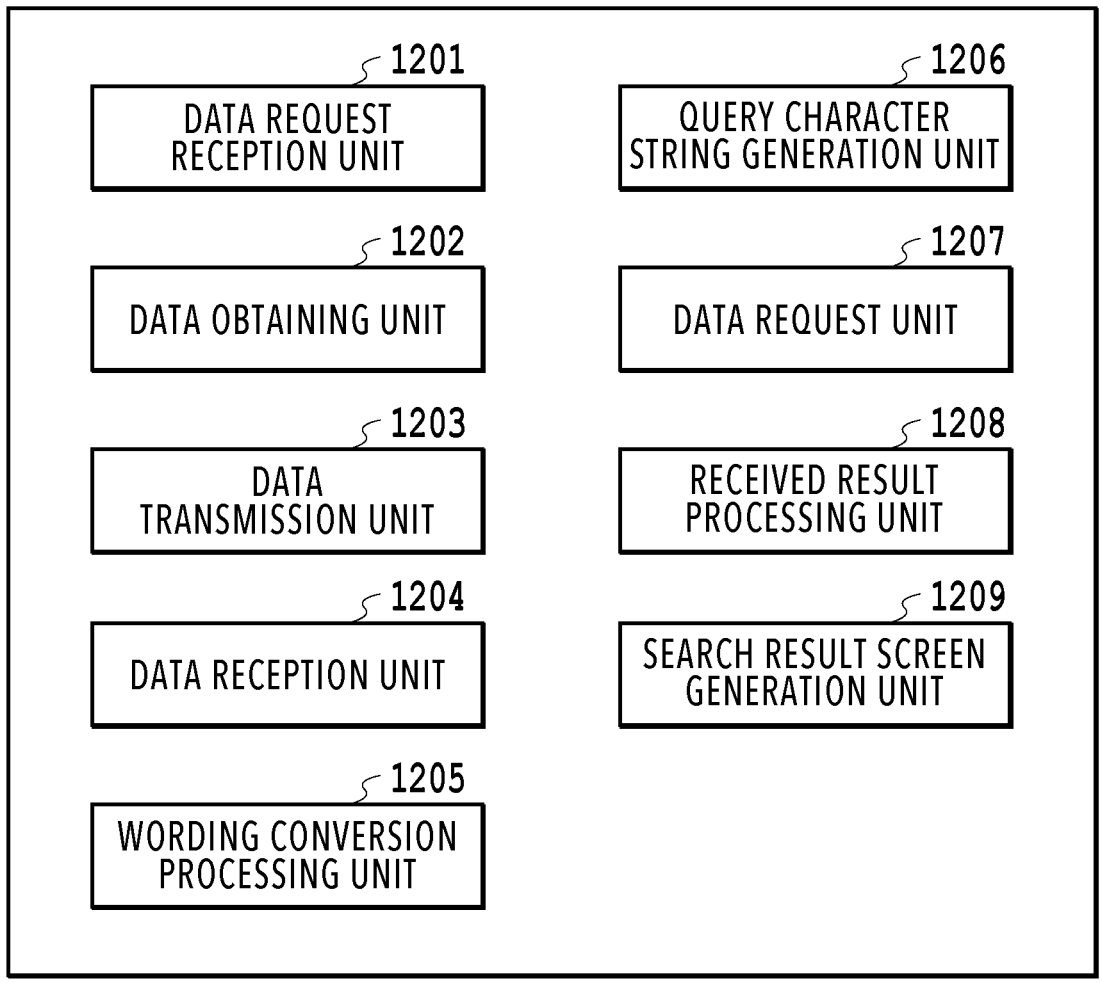
FIG. 12 is a function block diagram of software of the Web server.

FIG. 12 shows the function block diagram of software of the Web server 101 according to the present embodiment. The software of the Web server 101 includes the following function blocks. The function blocks are a data request reception unit 1201, a data obtaining unit 1202, a data transmission unit 1203, a data reception unit 1204, a wording conversion unit 1205, a query character string generation unit 1206, a data request unit 1207, a result processing unit 1208, and a screen generation unit 1209.

The data request reception unit 1201 receives a request to access data from the client terminal 103 via the network communication unit 207.

The data obtaining unit 1202 obtains the data by communicating with the client terminal 103 in accordance with the request received by the data request reception unit 1201.

The data transmission unit 1203 transmits the following data to the client terminal 103 via the network communication unit 207. The HTML file of the search screen, the Javascript program of the search processing, the list file in which the domain names of the search-target sites are stored, the keyword wording conversion list file, and the HTML data of the search result screen are included in the data.

The data reception unit 1204 receives the data from an external server such as the client terminal 103 and the search engine server 102, via the network communication unit 207. Specifically, the data reception unit 1204 receives the selected value of the pulldown list of the search condition and the input value of the Search word input field from the client terminal 103. Further, the data reception unit 1204 receives the total number of the searches and the data of the thumbnail image URL, the title, and the link destination URL of the contents for each of the search result(s) from the search engine server 102.

The wording conversion unit 1205 converts the selected value of the pulldown list of the Web browser, which is received from the client terminal 103 via the data reception unit 1204, into the wording in accordance with the search-target site.

The query character string generation unit 1206 configures the query character string that is transmitted to the search engine server 102 from the wording in accordance with the search-target site, which is converted by the wording conversion unit 1205.

The data request unit 1207 performs a request to access the data to the external server such as the search engine server 102, via the network communication unit 207. Specifically, the data request unit 1207 transmits the query character string generated by the query character string generation unit 1206 to the search engine server 102 and requests the search result(s) from the search engine server 102.

The result processing unit 1208 rearranges the search result(s) obtained from the search engine server 102 via the data reception unit 1204, to the search result(s) for each site.

The screen generation unit 1209 generates the HTML data of the search result screen from the search result(s) processed by the result processing unit 1208.

<Software Configuration of Client Terminal>

Figure 13:
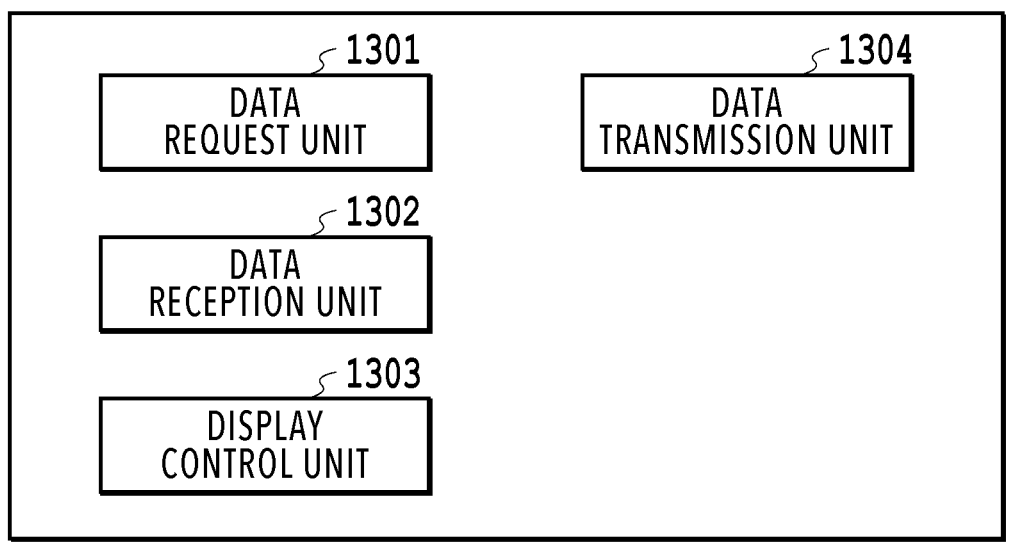
FIG. 13 is a function block diagram of software of the client terminal.

FIG. 13 shows the function block diagram of software of the client terminal 103 according to the present embodiment. The software of the client terminal 103 includes a data request unit 1301, a data reception unit 1302, a display control unit 1303, and a data transmission unit 1304.

The data request unit 1301 performs a request to access the data to the Web server 101 via the network communication unit 307.

The data reception unit 1302 receives data from the external server such as the Web server 101, via the network communication unit 307. Specifically, the data reception unit 1302 receives the HTML file of the search screen, the Javascript program of the search processing, the list file in which the domain names of the search-target sites are stored, and the keyword wording conversion list file from the Web server 101. In addition, the data reception unit 1302 also receives the HTML data of the search result screen from the Web server 101.

The display control unit 1303 displays the results of the OS, the Web browser, and the application on the display unit 306.

The data transmission unit 1304 transmits the selected value of the pulldown list and the input value of the Search word input field on the search screen of the Web browser to the Web server 101 via the network communication unit 307.

<Search Processing>

Figure 14:
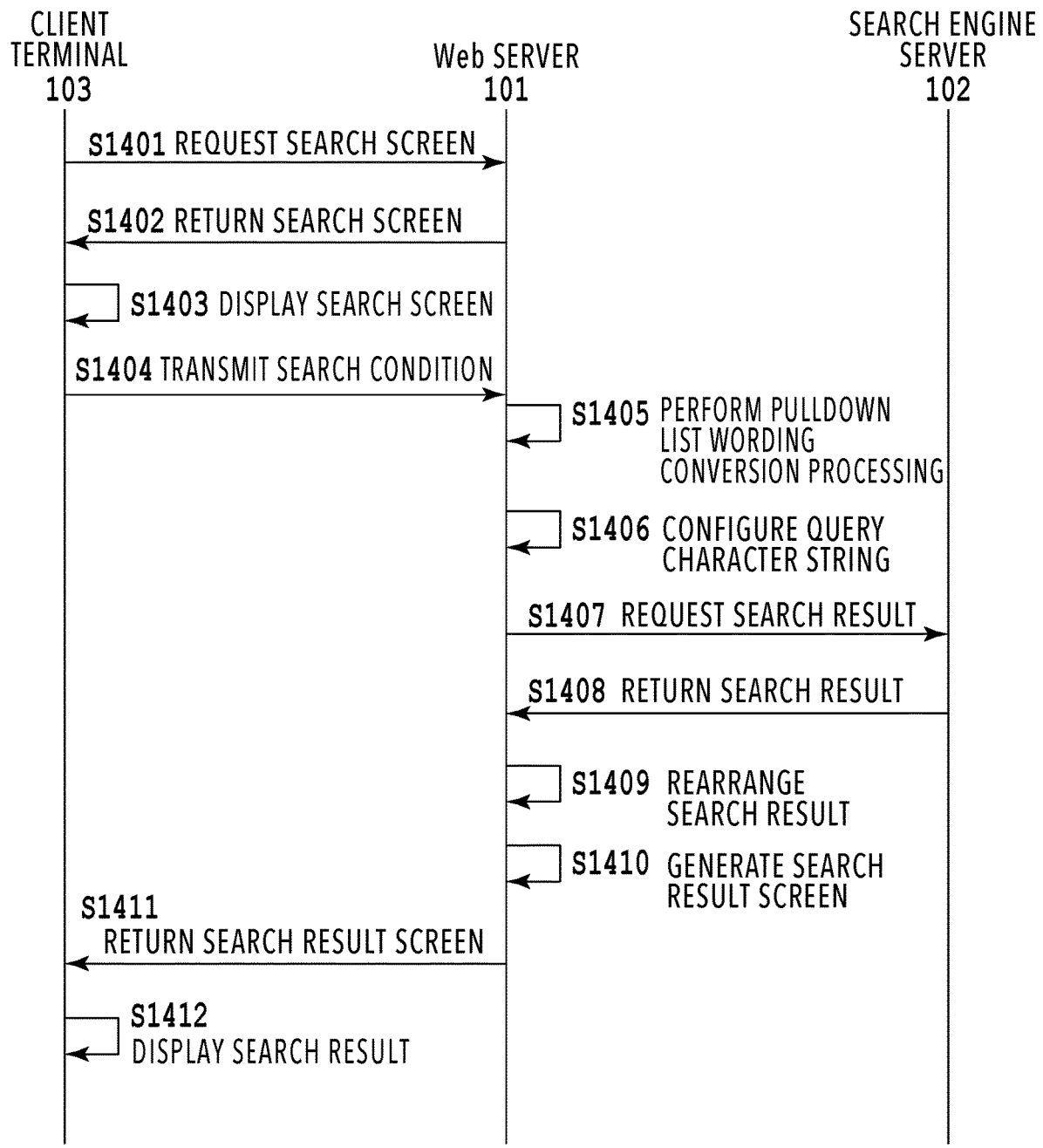
FIG. 14 is a sequence chart showing one example in which the educational material contents are searched.

FIG. 14 is a sequence chart showing one example of the processing in which the client terminal 103 displays the search result(s) by accessing the search engine server 102 by using the Web browser and obtaining the search result(s).

The processing of the client terminal 103 in FIG. 14 is implemented by, for example, the CPU 301 reading programs stored in the ROM 303 onto the RAM 302 and executing the programs.

The processing of the Web server 101 in FIG. 14 is implemented by, for example, the CPU 201 reading programs stored in the ROM 203 onto the RAM 202 and executing the programs.

The processing of the search engine server 102 in FIG. 14 is implemented by, for example, the CPU 201 reading programs stored in the ROM 203 onto the RAM 202 and executing the programs.

It may also be possible to implement part of or all of the processing in FIG. 14 by hardware such as an ASIC or an electronic circuit.

In the following, the main unit of each piece of the processing is the CPUs which are included in the client terminal 103, the Web server 101, and the search engine server 102.

The processing at S1401 is the same as that explained at S601 in FIG. 6, and therefore, explanation of the processing at S1401 is omitted.

At S1402, the Web server 101 returns the HTML file of the search screen 702 requested by the client terminal 103 to the Web browser of the client terminal 103. This HTML file is stored in advance in the Web server 101.

At S1403, the client terminal 103 reads the HTML file received from the Web server 101 at S1402 by the Web browser and displays the search screen 702.

At S1404, in a case where the pressing down of the Search button 705 by the user is detected, the data transmission unit 1304 of the client terminal 103 transmits the selected value of the pulldown list 703 and the input value of the Search word input field 704 to the Web server 101 by the Web browser.

At S1405, the wording conversion unit 1205 of the Web server 101 performs the following processing for the selected value of the pulldown list 703, which is received from the client terminal 103 at S1404. The wording conversion unit 1205 converts the selected value of the pulldown list 703 into wording in accordance with the search-target site by using the list file in which the domain names of the search-target sites are stored and the keyword wording conversion list file of the Web server 101, and stores the wording. Details of the processing of the pulldown list wording conversion processing at S1404, which is performed by the wording conversion unit 1205 of the Web server 101, are the same as those of the processing of the pulldown list wording conversion processing at S604, which is performed by the wording conversion unit 504 of the client terminal 103, and therefore, explanation thereof is omitted.

At S1406, the query character string generation unit 1206 of the Web server 101 configures the following query character string in accordance with the notation determined in the search engine server 102. The query character string is configured so that the search is performed all at once for all the search-target sites by using the wording of each search-target site, which is converted at S1405, the search keyword by the input value of the Search word input field 704, and the domain name of the search-target site. In a case where the query character string is used, the result(s) is obtained in which the search result(s) for each search-target site is added up. Here, the search keyword by the input value of the Search word input field 704 is set to the search keyword without being converted.

At S1407, the data request unit 1207 of the Web server 101 transmits the query character string configured at S1406 to the search engine server 102. At S1407, in a case where the plurality of the search-target sites are registered in the search engine server 102, the search result(s) of all the search-target sites is requested.

At S1408, the data reception unit 1204 of the Web server 101 receives the total number of the searches and the data including the thumbnail image URL, the title, and the link destination URL of the contents for each of the search result(s) from the search engine server 102.

At S1409, the result processing unit 1208 of the Web server 101 performs the rearrangement of the search result (s) for each domain name of the educational material site and stores the rearranged search result(s).

At S1410, the screen generation unit of the Web server 101 generates the HTML data of the search result screen by using the search result(s) stored at S1409 and stores the HTML data.

At S1411, the data transmission unit 1203 of the Web server 101 transmits the HTML data generated at S1410 to the data reception unit 1302 of the client terminal 103.

At S1412, the display control unit 1303 of the client terminal 103 displays the search result screen 801 by using the HTML data of the search result screen received at S1411. The order of display of each of the search result(s) may be for each domain name of the educational material site, or the order as it is received from the search engine server 102.

As explained above, according to the present embodiment, the pulldown list wording conversion processing, the configuration of the query character string, the communication with the search engine server 102, the rearrangement of the search result(s), and the HTML data generation processing are performed by the Web server 101. The processing that is performed by the client terminal 103 is only the communication with the Web server and the screen display processing, and therefore, it is possible to reduce the processing load of the client terminal 103 compared with that in the first embodiment.

Further, in the present embodiment, the explanation is given by using the case where the Web server 101, the search engine server 102, and the client terminal 103 are connected via the internet, but the connection aspect is not limited to this. For example, the Web server 101, the search engine server 102, and the client terminal 103 may be locally connected to one another.

Fourth Embodiment

In the third embodiment, the example is explained in which the query character string is generated from the search keyword including the character string obtained by converting the selected value of the pulldown list 703 for each search-target site at S1405, and then the summed query character string is configured by summing up the query character string.

However, there is an upper limit to the length of URL including the query character string, which the search engine server 102 can receive. In a case where the number of search-target sites is large, there is such a problem that the query character string becomes long and it is not possible for the data request unit 1207 of the Web server 101 to transmit the query character string to the search engine server 102.

Further, at S1409, in the search result(s) for the query character string by the search engine server 102, the order of the search result(s) for each search-target site is changed to the order of the score evaluated inside the search engine server 102.

In a case where the upper limit to the number of the search result(s) to be returned at a time from the search engine server 102 is set, the following problem occurs. That is, such a problem occurs that it is not possible for the Web server 101 to determine whether or not the number of search result(s) for each search-target site has reached the upper limit at the time of the rearrangement processing at S1409 only by using the search result(s) returned from the search engine server 102.

In the present embodiment, an aspect is explained in which it is possible to suppress the query character string from becoming long and determine whether or not the number of search result(s) has reached the upper limit for each search-target site by performing the search by the query character string for each search-target site.

In the present embodiment, points different from those of the third embodiment are mainly explained.

Further, it is assumed that the software configuration of the Web server 101 and the software configuration of the client terminal 103 in the present embodiment are the same as those of the third embodiment.

Figure 15:
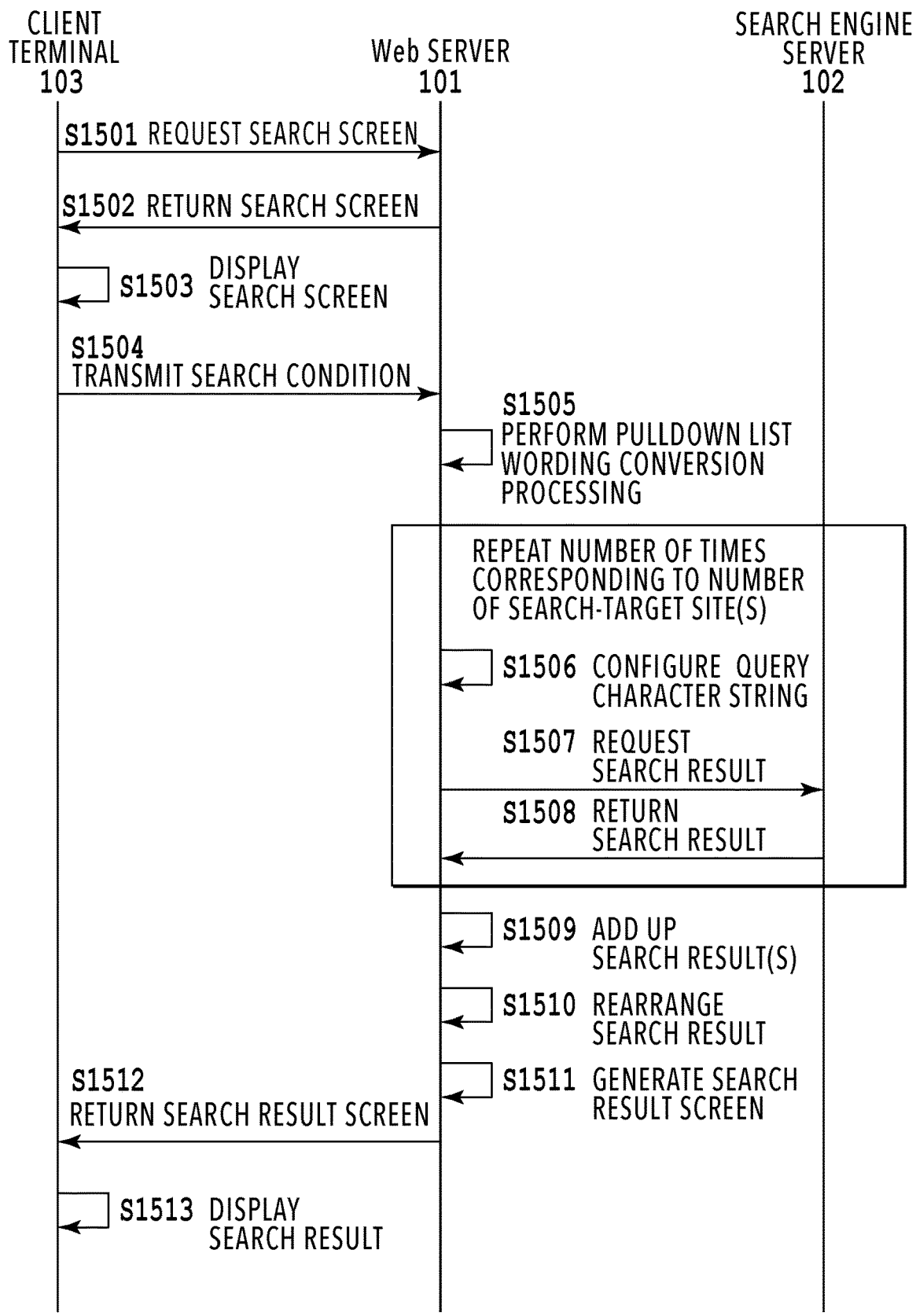
FIG. 15 is a sequence chart showing one example in which the educational material contents are searched.

FIG. 15 is a sequence chart showing one example of the processing in which the client terminal 103 displays the search result(s) by accessing the search engine server 102 by using the Web browser and obtaining the search result(s).

The processing of the client terminal 103 in FIG. 15 is implemented by, for example, the CPU 301 reading programs stored in the ROM 303 onto the RAM 302 and executing the programs.

The processing of the Web server 101 in FIG. 15 is implemented by, for example, the CPU 201 reading programs stored in the ROM 203 onto the RAM202 and executing the programs.

The processing of the search engine server 102 in FIG. 15 is implemented by, for example, the CPU 201 reading programs stored in the ROM 203 onto the RAM 202 and executing the programs.

It may also be possible to implement part of or all of the processing in FIG. 15 by hardware such as an ASIC or an electronic circuit.

In the following, the main unit in each piece of the processing is the CPUs which are included in the client terminal 103, the Web server 101, and the search engine server 102.

The processing of S1501 to S1505 is the same as the processing of S1401 to S1404 in FIG. 14, and therefore, the explanation of the processing is omitted.

In the processing at S1506 to S1508, the list of domain names of search-target sites received at S1502 is repeatedly used as the processing target.

At S1506, the query character string generation unit 1206 of the Web server 101 configures the following query character string in accordance with the notation determined in the search engine server 102. The query character string includes the wording of each search-target site, which is converted at S1505, the search keyword by the input value of the Search word input field 704, and the domain name of the search-target site. The query character string is generated for each search-target site. Here, the search keyword by the input value of the Search word input field 704 is set to the search keyword without being converted.

At S1507, the data request unit 1207 of the Web server 101 transmits the query character string configured at S1506 to the search engine server 102.

At S1508, the data reception unit 1204 of the Web server 101 receives the total number of the searches and the data including the thumbnail image URL, the title, and the link destination URL of the contents of each of the search result(s) for each search-target site from the search engine server 102. Then, the Web server 101 stores the received data as the search result(s) of the search-target site being processed.

At S1509, the result processing unit 1208 of the Web server 101 stores the search result(s) received at S1508 of each search-target site all at once.

At S1510, the result processing unit 1208 of the Web server 101 performs the rearrangement of the search result (s) for each domain name of the educational material site and stores the rearranged search result(s).

At S1511, the screen generation unit of the Web server 101 generates the HTML data of the search result screen by using the search result(s) stored at S1510 and stores the HTML data.

At S1512, the data transmission unit 1203 of the Web server 101 transmits the HTML data generated at S1511 to the data reception unit 1302 of the client terminal 103.

At S1513, the display control unit 1303 of the client terminal 103 displays the search result screen 801 by using the HTML data of the search result screen received at S1512. The order of display of each of the search result(s) may be for each domain name of the educational material site, or the order as it is received from the search engine server 102.

In the present embodiment, the query character string configured at S1406 includes the search keyword and the domain name in accordance with one search-target site, and therefore, the query character string does not become too long. It is possible for the Web server 101 to securely transmit the query character string to the search engine server 102. Further, the search-target site is searched individually, and therefore, it also becomes possible to perform the rearrangement processing by determining whether or not the number of the search result(s) for each search-target site has reached the upper limit.

Further, in the present embodiment, the explanation is given by using the case where the Web server 101, the search engine server 102, and the client terminal 103 are connected via the internet, but the connection aspect is not limited to this. For example, the Web server 101, the search engine server 102, and the client terminal 103 may be locally connected to one another.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-171482, filed Oct. 26, 2022, which is hereby incorporated by reference wherein in its entirety.

What is claimed is:

1. A method for generating at least one query character string used for searching for contents, the method comprising:

displaying a screen on a display of an information processing apparatus by one or more processor of the information processing apparatus executing instructions received from a Web server, wherein the screen includes first and second areas, and wherein the first area displays a plurality of keyword candidates in a pulldown list for causing a user to select one of the displayed plurality of keyword candidates, and wherein the second area is an area to which a user manually inputs a keyword;

receiving, via the screen by the one or more processor of the information processing apparatus executing the instructions, a first keyword candidate selected by the user from among the plurality of keyword candidates displayed in the first area of the pulldown list and a second keyword input manually by the user in the second area;

converting the selected first keyword candidate to synonyms which are obtained based on the selected first keyword candidate and a plurality of search-target sites, wherein converting the selected first keyword candidate to the synonyms includes:

collating a selected value keyword of a keyword wording conversion list file with a domain name by using the selected first keyword candidate selected by the user from the pulldown list and a domain name of a search-target site, of the plurality of search target sites, to be processed; and storing the collated selected value keyword and the domain name in a row that matches with the keyword wording conversion list file and a synonym, wherein the plurality of search-target sites includes at least first and second search-target sites, wherein the selected first keyword candidate is converted to a first synonym for the first search-target site in a case where the first synonym corresponding to the selected first keyword candidate exists in the first search-target site, wherein the selected first keyword candidate is converted to a blank character in a case where the first synonym corresponding to the selected first keyword candidate does not exist in the first search-target site, wherein the selected first keyword candidate is further converted to a second synonym for the second search-target site in a case where the second synonym corresponding to the selected first keyword candidate exists in the second search-target site, wherein the selected first keyword candidate is converted to a blank character in a case where the second synonym corresponding to the selected first keyword candidate does not exist in the second search-target site, and wherein the second keyword is not converted to a synonym;

generating the at least one query character string including at least first and second sets, wherein the first set includes the first synonym, the second keyword and first information for identifying the first search-target site, and wherein the second set includes the second synonym, the second keyword and second information for identifying the second search-target site;

outputting the generated at least one query character string for searching for the contents;

obtaining a search result of the contents searched-for by using the generated at least one query character string; and arranging the obtained search result in accordance with the plurality of search- target sites.

2. The method according to claim 1, further comprising:
obtaining a search result of the contents searched-for by using the generated at least one query character string.

3. The method according to claim 1, wherein the first information for identifying the first search-target site is a Uniform Resource Locator (URL) of the first search-target site, and
the second information for identifying the second search-target site is a Uniform Resource Locator (URL) of the second search-target site.

4. The method according to claim 1, wherein
one query character string including both of the first set and the second set is generated as the at least one query character string.

5. The method according to claim 4, wherein
the generated one query character string is output to a server.

6. The method according to claim 5, wherein
a search result of the contents for the generated one query character string is obtained from the server.

7. The method according to claim 1, wherein
a first query character string and a second query character string are generated as the at least one query character string, the first query character string including the first set, the second query character string including the second set, and
wherein the generated first query character string and the generated second query character string are individually output.

8. The method according to claim 7, wherein
the generated first query character string and the generated second query character string are individually output to a server.

9. The method according to claim 8, wherein
search results of the contents for the generated first query character string and the generated second query character string are individually obtained from the server.

10. The method according to claim 1, wherein
the instructions received from the Web server include the plurality of keyword candidates.

11. The method according to claim 10, wherein
the instructions further include the first synonym, which is associated with both of the first keyword candidate and the first search-target site, and the second synonym which is associated with both of the first keyword candidate and the second search- target site.

12. A server comprising:
one or more memories storing instructions; and
one or more processors executing the instructions to provide a program to an information processing apparatus, wherein
a processor of the information processing apparatus executes the provided program to perform:

displaying a screen on a display of the information processing apparatus, wherein the screen includes first and second areas, and wherein the first area displays a plurality of keyword candidates in a pulldown list for causing a user to select one of the displayed plurality of keyword candidates, and wherein the second area is an area to which a user manually inputs a keyword;

receiving, via the screen, a first keyword candidate selected by the user from among the plurality of keyword candidates displayed in the first area of the pulldown list and a second keyword input manually by the user in the second area;

converting the selected first keyword candidate to synonyms which are obtained based on the selected first keyword candidate and a plurality of search-target sites, wherein converting the selected first keyword candidate to the synonyms includes:

collating a selected value keyword of a keyword wording conversion list file with a domain name by using the selected first keyword candidate selected by the user from the pulldown list and a domain name of a search-target site, of the plurality of search target sites, to be processed; and storing the collated selected value keyword and the domain name in a row that matches with the keyword wording conversion list file and a synonym, wherein the plurality of search-target sites includes at least first and second search-target sites, wherein the selected first keyword candidate is converted to a first synonym for the first search-target site in a case where the first synonym corresponding to the selected first keyword candidate exists in the first search-target site, wherein the selected first keyword candidate is converted to a blank character in a case where the first synonym corresponding to the selected first keyword candidate does not exist in the first search-target site, wherein the selected first keyword candidate is further converted to a second synonym for the second search-target site in a case where the second synonym corresponding to the selected first keyword candidate exists in the second search-target site, wherein the selected first keyword candidate is converted to a blank character in a case where the second synonym corresponding to the selected first keyword candidate does not exist in the second search-target site, and wherein the second keyword is not converted to a synonym;

generating at least one query character string including at least first and second sets, wherein the first set includes the first synonym, the second keyword and first information for identifying the first search-target site, and wherein the second set includes the second synonym, the second keyword and second information for identifying the second search-target site;

outputting the generated at least one query character string for searching for contents;

obtaining a search result of the contents searched-for by using the generated at least one query character string; and arranging the obtained search result in accordance with the plurality of search-target sites.

13. The server according to claim 12, wherein the server is a Web server.

14. The server according to claim 12, wherein the server is a Web server, and wherein the generated at least one query character string is outputted to a search engine server.

15. An information processing apparatus comprising:
one or more memories storing instructions received from a Web server; and
one or more processors executing the instructions to perform:
  displaying a screen on a display of the information processing apparatus, wherein the screen includes first and second areas, and wherein the first area displays a plurality of keyword candidates in a pulldown list for causing a user to select one of the displayed plurality of keyword candidates, and wherein the second area is an area to which a user manually inputs a keyword;
  receiving, via the screen, a first keyword candidate selected by the user from among the plurality of keyword candidates displayed in the first area of the pulldown list and a second keyword input manually by the user in the second area;
  converting the selected first keyword candidate to synonyms which are obtained based on the selected first keyword candidate and a plurality of search-target sites,
  wherein converting the selected first keyword candidate to the synonyms includes:
    collating a selected value keyword of a keyword wording conversion list file with a domain name by using the selected first keyword candidate selected by the user from the pulldown list and a domain name of a search-target site, of the plurality of search target sites, to be processed; and
    storing the collated selected value keyword and the domain name in a row that matches with the keyword wording conversion list file and a synonym,
  wherein the plurality of search-target sites includes at least first and second search-target sites, wherein the selected first keyword candidate is converted to a first synonym for the first search-target site in a case where the first synonym corresponding to the selected first keyword candidate exists in the first search-target site, wherein the selected first keyword candidate is converted to a blank character in a case where the first synonym corresponding to the selected first keyword candidate does not exist in the first search-target site, wherein the selected first keyword candidate is further converted to a second synonym for the second search-target site in a case where the second synonym corresponding to the selected first keyword candidate exists in the second search-target site, wherein the selected first keyword candidate is converted to a blank character in a case where the second synonym corresponding to the selected first keyword candidate does not exist in the second search-target site, and wherein the second keyword is not converted to a synonym;
  generating at least one query character string including at least first and second sets, wherein the first set includes the first synonym, the second keyword and first information for identifying the first search-target site, and wherein the second set includes the second synonym, the second keyword and second information for identifying the second search-target site;
  outputting the generated at least one query character string for searching for contents;
  obtaining a search result of the contents searched-for by using the generated at least one query character string; and
  arranging the obtained search result in accordance with the plurality of search-target sites.

16. The information processing apparatus according to claim 15, wherein
the information processing apparatus is one of a Personal Computer (PC), a tablet terminal, and a smartphone.

17. A non-transitory computer readable storage medium storing a program for causing an information processing apparatus to perform:
  displaying a screen on a display of the information processing apparatus, wherein the screen includes first and second areas, and wherein the first area displays a plurality of keyword candidates in a pulldown list for causing a user to select one of the displayed plurality of keyword candidates, and wherein the second area is an area to which a user manually inputs a keyword;
  receiving, via the screen, a first keyword candidate selected by the user from among the plurality of keyword candidates displayed in the first area of the pulldown list and a second keyword input manually by the user in the second area;
  converting the selected first keyword candidate to synonyms which are obtained based on the selected first keyword candidate and a plurality of search-target sites,
  wherein converting the selected first keyword candidate to the synonyms includes:

collating a selected value keyword of a keyword wording conversion list file with a domain name by using the selected first keyword candidate selected by the user from the pulldown list and a domain name of a search-target site, of the plurality of search target sites, to be processed; and storing the collated selected value keyword and the domain name in a row that matches with the keyword wording conversion list file and a synonym, wherein the plurality of search-target sites includes at least first and second search-target sites, wherein the selected first keyword candidate is converted to a first synonym for the first search-target site in a case where the first synonym corresponding to the selected first keyword candidate exists in the first search-target site, wherein the selected first keyword candidate is converted to a blank character in a case where the first synonym corresponding to the selected first keyword candidate does not exist in the first search-target site, wherein the selected first keyword candidate is further converted to a second synonym for the second search-target site in a case where the second synonym corresponding to the selected first keyword candidate exists in the second search-target site, wherein the selected first keyword candidate is converted to a blank character in a case where the second synonym corresponding to the selected first keyword candidate does not exist in the second search-target site, and wherein the second keyword is not converted to a synonym;

generating at least one query character string including at least first and second sets, wherein the first set includes the first synonym, the second keyword and first information for identifying the first search-target site, and wherein the second set includes the second synonym, the second keyword and second information for identifying the second search-target site;

outputting the generated at least one query character string for searching for contents;

obtaining a search result of the contents searched-for by using the generated at least one query character string; and arranging the obtained search result in accordance with the plurality of search- target sites.

18. The method according to claim 1, wherein
the converting, the generating and the outputting are performed by the one or more processors of the information processing apparatus executing the instructions.

19. The method according to claim 1, wherein
the converting, the generating and the outputting are performed by the Web server.

\* \* \* \* \*